(12) United States Patent
Zhao et al.

(10) Patent No.: US 12,305,890 B2
(45) Date of Patent: May 20, 2025

(54) ADDITIVE MANUFACTURING OF METAL FILMS

(71) Applicant: ARIZONA BOARD OF REGENTS ON BEHALF OF ARIZONA STATE UNIVERSITY, Scottsdale, AZ (US)

(72) Inventors: Zhi Zhao, Mesa, AZ (US); Chao Wang, Chandler, AZ (US); Yu Yao, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 745 days.

(21) Appl. No.: 17/628,627

(22) PCT Filed: Jul. 8, 2020

(86) PCT No.: PCT/US2020/041250
§ 371 (c)(1),
(2) Date: Jan. 20, 2022

(87) PCT Pub. No.: WO2021/015952
PCT Pub. Date: Jan. 28, 2021

(65) Prior Publication Data
US 2022/0275972 A1     Sep. 1, 2022

Related U.S. Application Data

(60) Provisional application No. 62/877,140, filed on Jul. 22, 2019.

(51) Int. Cl.
*F24S 23/70*  (2018.01)
*G02B 1/12*   (2006.01)
*G02B 5/08*   (2006.01)

(52) U.S. Cl.
CPC ............. *F24S 23/82* (2018.05); *G02B 1/12* (2013.01); *G02B 5/0808* (2013.01)

(58) Field of Classification Search
CPC .. F24S 23/82; F24S 23/70; G02B 1/12; G02B 1/14; G02B 5/0808; G02B 5/085; G02B 5/0866

(Continued)

(56) References Cited

U.S. PATENT DOCUMENTS 4,179,181 A  * 12/1979  Chang ................... G02B 5/282
                                                            427/160
4,917,447 A  *  4/1990  Newnam .................. G02B 5/09
                                                            359/861

(Continued)

FOREIGN PATENT DOCUMENTS

CN       109136840 A     1/2019
WO    2018077858 A1     5/2018

(Continued)

OTHER PUBLICATIONS

Search Report and Written Opinion mailed Dec. 30, 2020 in corresponding International Application No. PCT/US2020/041250, 10 pages.

(Continued)

*Primary Examiner* — Ricky D Shafer
(74) *Attorney, Agent, or Firm* — MH2 Technology Law Group, LLP (57) ABSTRACT

Reflectors for concentrated solar power as well as systems and methods for additively manufacturing the reflectors is provided. The disclosed method can directly print metal films from an aqueous precursor solution onto a substrate with little to no post-fabrication treatment to achieve highly reflective surfaces with low surface roughness. The method provides precise control to form a metal film having an RMS (Continued)

surface roughness of about 2 to about 5 nm and a relative reflectivity of about 90% to about 96% at 550 nm on a substrate having an area of at least 1 square meter.

11 Claims, 9 Drawing Sheets

(58) Field of Classification Search
USPC .................................................. 359/871, 883
See application file for complete search history.

(56) References Cited

U.S. PATENT DOCUMENTS

| | | | |
|---|---|---|---|
| 8,012,676 B2 | 9/2011 | Yoshiki et al. | |
| 8,568,834 B2 | 10/2013 | Mitina et al. | |
| 11,135,649 B2* | 10/2021 | Zhao | B33Y 10/00 |
| 11,826,946 B2* | 11/2023 | Zhao | B33Y 70/10 |
| 2004/0079195 A1* | 4/2004 | Perry | H01B 1/22 |
| | | | 257/E21.582 |
| 2013/0283794 A1* | 10/2013 | Taillemite | B29C 70/12 |
| | | | 60/641.15 |
| 2013/0342900 A1* | 12/2013 | Koeckert | G02B 5/0875 |
| | | | 359/359 |
| 2014/0053607 A1 | 2/2014 | Angel et al. | |
| 2014/0313574 A1* | 10/2014 | Bills | H02S 40/22 |
| | | | 427/457 |
| 2015/0285956 A1* | 10/2015 | Schmidt | G02B 5/0841 |
| | | | 427/162 |
| 2015/0301244 A1 | 10/2015 | Van Nutt et al. | |
| 2017/0056834 A1 | 3/2017 | Bhushan et al. | |
| 2018/0319110 A1* | 11/2018 | Solgaard | B29C 71/04 |
| 2019/0098767 A1* | 3/2019 | Hasegawa | H05K 3/1208 |
| 2019/0302532 A1* | 10/2019 | Zhong | G02F 1/133611 |

FOREIGN PATENT DOCUMENTS

| | | |
|---|---|---|
| WO | 2018141741 A1 | 8/2018 |
| WO | 2019117723 A1 | 6/2019 |

OTHER PUBLICATIONS

Zaier et al., "Generating highly reflective and conductive metal layers through a light-assisted synthesis and assembling of silver nanoparticles in a polymer matrix," Scientific Reports, vol. 7, Art. No. 12410, Sep. 29, 2017 [retrieved on Jan. 19, 2022]. Retrieved from the internet: <URL: https://www.nature.com/articles/s41598-017-12617-8>, 10 pages.

* cited by examiner

ADDITIVE MANUFACTURING OF METAL FILMS

CROSS-REFERENCE TO RELATED APPLICATION

This application is a national stage entry under 35 U.S.C. § 371 of PCT Application No. PCT/US2020/041250 entitled "ADDITIVE MANUFACTURING OF METAL FILMS" filed Jul. 8, 2020, which claims the benefit of U.S. Provisional Application No. 62/877,140, filed Jul. 22, 2019, the disclosures of all of which are hereby incorporated by reference in their entireties.

TECHNICAL FIELD

This invention relates to additive manufacturing of reflective metal films and, more particularly, to reflective metal films for applications such as solar power reflectors.

BACKGROUND

Concentrating solar power (CSP) systems use mirrors, also referred to herein as reflectors, to concentrate sunlight and covert it into heat. Interest in CSP technology has grown with the recognition that it presents a viable thermal energy storage capability that directly addresses grid integration challenges and allows solar-generated heat to be stored until it is needed. Mirrors for CSP systems can vary in size and shape, for example, from flat, to parabolic to dish shaped. Manufacturing of CSP mirrors requires coating reflective metal films, for example as silver (Ag) metal films, on the front or back side of an optically transparent substrate (e.g., glass or polymer). Glass substrates have been the traditional choice in industrial CSP systems because of their high optical performance and long lifetime, however, glass is fragile, heavy, and expensive. Current mirror manufacturing approaches typically include depositing multiple layers of metal, including silver and protective coatings. Deposition of silver, for example, can include physical vapor deposition (PVD) or wet chemical processing (such as electroless plating). However, PVD typically requires high temperature and high vacuum conditions, and thus is not ideal for high-throughput production. And, electroless plating of silver typically requires toxic and corrosive chemical baths. Moreover, the lack of control in silver reduction, nucleation, and growth processes usually results in non-uniform film thickness and rough film surface that can adversely affect specular reflection. Additionally, the manufacturing tools and processes required for PVD and wet processing are bulky, capital-intensive, and environmentally unfriendly, thus not suitable for regular maintenance in a CSP plant, which may require small-volume and just-in-time production. Therefore, it would be beneficial to have an improved system and method for printing metal film for use in manufacturing mirrors for concentrating solar power plants.

SUMMARY

According to the present teachings, a method of forming a reflector for a concentrated solar power system is provided. The method includes forming a precursor solution comprising a liquid, a compound comprising a metal, and an organic binder and irradiating the precursor solution with ultraviolet radiation to form a plurality of metal nanoparticles, wherein each of the plurality of metal nanoparticles comprises the metal and the organic binder. The plurality of metal nanoparticles are interconnected by the organic binder to form a metal film on a substrate, wherein the substrate has an area of at least 1 square meter and wherein the metal film comprises an RMS (Root Mean Square) surface roughness of about 2 to about 5 nm and a relative reflectivity of about 90% to about 96% at 550 nm.

According to the present teachings, the method can include the metal being silver, aluminum, platinum or mixtures thereof, the organic binder being polyallylamine, and the precursor solution further comprises a reducing agent. The method can optionally include irradiating the precursor solution with ultraviolet radiation to form a plurality of metal nanoparticles comprises, photo-initiating a reduction of the compound comprising the metal to form a plurality of metal ions, and binding of a portion of the metal ions by the organic binder to form the metal nanoparticles. The method can further include the reducing agent comprises sodium citrate, the metal is silver, and the organic binder is polyallylamine. The method can optionally include depositing the metal film to cover an area of at least about 1 square meter, wherein interconnecting the plurality of metal nanoparticles by the organic binder to form the metal film on a substrate comprises one or more cycles of refreshing the precursor solution, extending an area of the metal film by using an array of light sources to form adjacent and connected areas of metal film on the substrate, and extending an area of the metal film by moving a light source irradiating the precursor solution with ultraviolet radiation to form adjacent and connected areas of metal film on the substrate. The method can further optionally include forming a protective coating on the metal film, wherein the protective coating comprises a dielectric and prior to irradiating the precursor solution with ultraviolet radiation to form a plurality of metal nanoparticles, depositing an adhesion film on the substrate to promote adhesion of the metal film to the substrate.

According to the present teachings, a reflector for a concentrated solar power system is provided. The reflector can include a substrate comprising an area of at least 1 meter×1 meter, a reflective film comprising a plurality of metal nanoparticles bound by an organic binder to form a metal film, wherein the metal film comprises an RMS surface roughness of about 2 to about 5 nm and a relative reflectivity of about 90% to about 96% at 550 nm, and a protective film disposed over the reflective film.

According to the present teachings, the reflector for a concentrated solar power system can further include the reflective film comprises a plurality of additively manufactured metal films, the substrate comprises a glass, silicon, silicone, a synthetic polymer or a hydrogel, the metal nanoparticles comprise silver, gold, or platinum bound by polyallylamine, and the reflective film comprises a thickness of about 50 nm to about 200 nm. The reflector for the concentrated solar power system can optionally include a surface of the reflector that is curved. The reflector for the concentrated solar power system can optionally include a protective film comprises a dielectric material and a thickness of $10^0$-$10^3$ µm.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Disclosed herein are reflectors for use in CSP systems, additive manufacturing methods for forming the reflectors, and systems for additively manufacturing the reflectors. The method for forming the reflectors, also referred to herein as mirrors, can directly print metal films from an aqueous precursor solution with little to no post-fabrication treatment. The disclosed method avoids high temperature and high vacuum conditions to allow high throughput fabrication of large areas, avoids toxic and corrosive chemical baths, and provides precise control to form reflective metal films with high reflectance and small surface roughness similar to sputtered metal films. This method can further be applicable to a variety of substrates, including glass, plastics, polymers, hydrogels, papers, and inorganic substrates having planar, curved, and three-dimensional geometries. The disclosed reflectors for use in CSP plants are more cost efficient than conventional reflectors and can utilize substrate materials that are cheaper and more durable than glass. The disclosed system for fabricating the reflectors for CSP plants, unlike bulky, capital-intensive, and environmentally unfriendly conventional systems, can be also used for regular maintenance in a CSP plant that may require small-volume and just-in-time fabrication.

As used herein with respect to the disclosed methods and systems, "printing" the metal film is used interchangeably with "growing," "depositing," and "forming" the metal film. The process for printing the metal film involves a two-step reaction pathway, namely metal nanoparticle (MNP) generation and MNP interconnection. In the case of a silver film, for example, the first step is the formation of silver nanoparticles (AgNPs) under UV illumination by photoreduction of silver nitrate with sodium citrate as the reducing agent. The AgNPs are stabilized in solution as an intermediate product. In the next step, the as-formed AgNPs are bound to an organic binder pAAm and undergo further growth to form a continuous crystalline structure. The organic binder serves to assist metal nucleation and uniform film growth. Here, pAAm acts as a chain to tether initially formed AgNPs into a cluster through the coordination between amine groups and silver, thereby reducing the interparticle distance and facilitate interconnections between silver particles. The unbound amine groups on the pAAm may serve as a secondary reducing agent that facilitates the formation of continuous metal films. As the AgNPs are tethered onto pAAm, the relative positions of AgNPs and amine groups are fixed. For example, amine groups located between two adjacent AgNPs may link them together. Consequently, the reducing reaction tends to occur along the polymer chain, leading to large, well-connected metal particles.

Figure 1A:
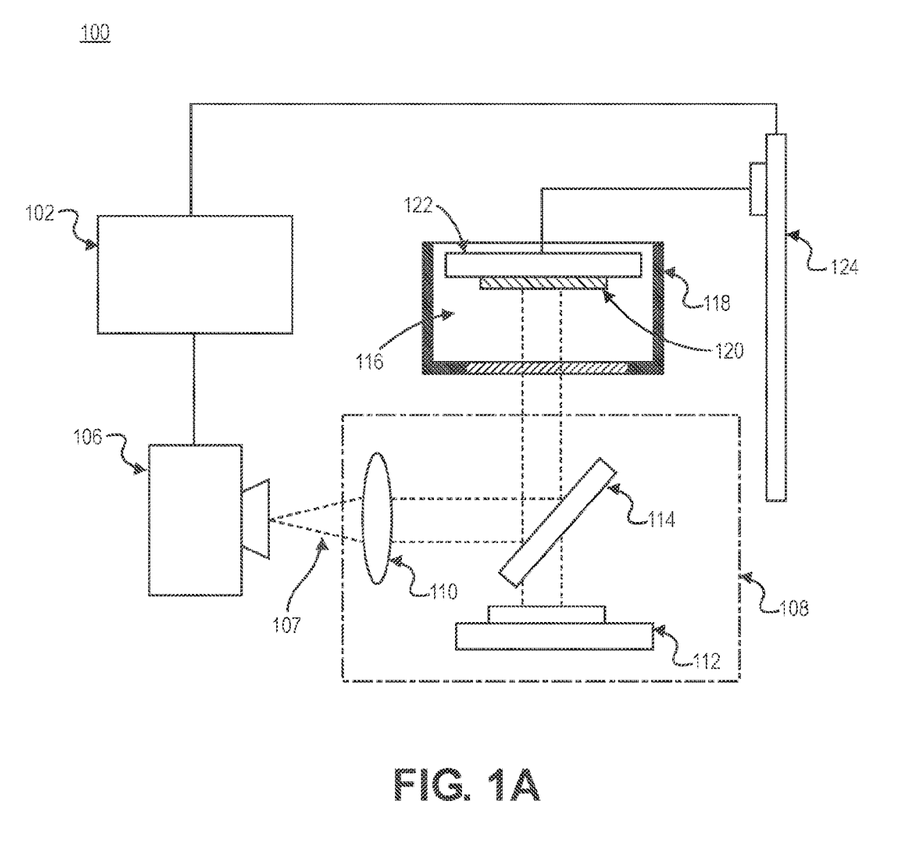
FIG. 1A schematically depicts a system for additive manufacturing of silver films according to the present teachings.

FIG. 1A depicts an exemplary stereolithography (SL) system 100 for additive manufacturing of reflectors for CSP systems in accordance with the present teachings. SL system 100 includes a controller 102. Controller 102 can be, for example, a computer including software that provides instructions to a digital light processor (DLP) 106. DLP 106 includes one or more light sources, for example, one or more lasers or LEDs that emit radiation 107 in the ultraviolet (UV) range. Radiation 107 from DLP 106 is provided to optical system 108. Optical system 108 includes one or more lenses 110, a camera 112, a beam splitter 114, and other optical components. Optical system 108 selectively irradiates a precursor solution 116 in a precursor reservoir 118. Precursor solution 116 includes a liquid, a compound comprising a metal and an organic binder. In use, a substrate 120 can be mounted in SL system 100 on a motorized stage 122. Motorized stage 122 is operatively coupled to stage controller 124 and can be controlled by controller 102.

In some embodiments, SL system 100 can include an array of light sources to achieve meter-scale and multi-material printing. Using arrays of commercially available UV LEDs as the light source, for example, an illumination area can be extended in each exposure using motorized stage 122 and stage controller 124. By stitching exposures together, edge to edge, will allow expansion to meter scale. For example, arranging UV LEDs (e.g. NVSU333A from Nichia, output power ~4 W, illumination size 3 mm) in an N by N array can enlarge the exposure area by $N^2$ (for N=30, the area is 90 mm by 90 mm). Stitching the printed area by 120 times would yield a meter square printed area. Choosing high-power LED or scanning laser as the light source can minimize the exposure time and yield a high illumination intensity that facilitates high metal film growth rate.

Figure 2:
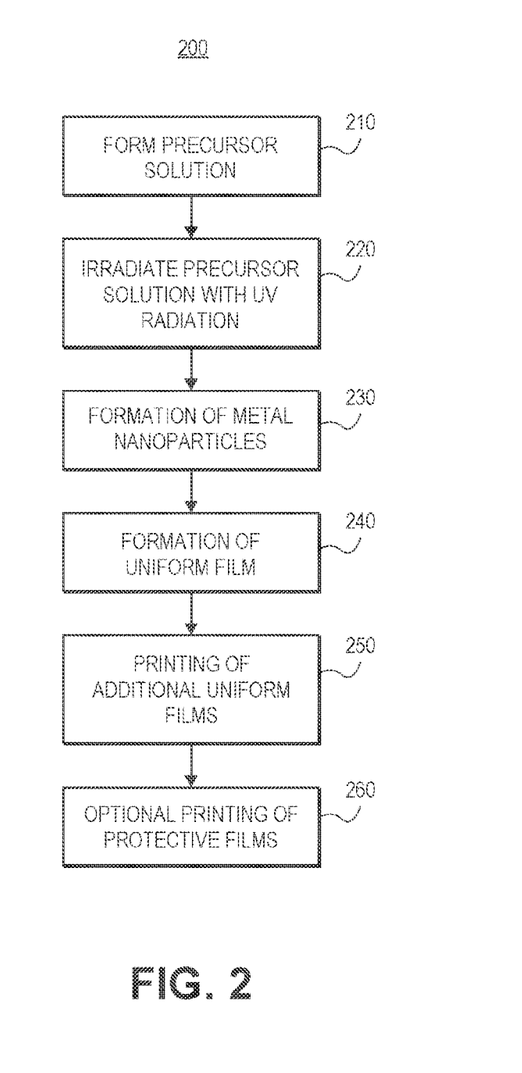
FIG. 2 depicts a method for forming reflectors according to the present teachings.

A method 200 for forming a reflector for use in a CSP system is shown in FIG. 2. At 210 of method 200, a precursor solution, for example precursor solution 116, is formed comprising a liquid, a compound comprising a metal, and an organic binder. The liquid can be water or a mixture of water and other water-soluble components. Non-limiting examples of the water soluble components includes alcohols, such as ethanol and isopropyl alcohol, dimethyl sulfoxide (DMSO), and polymers, such as polyethylene glycol (PEG). The compound comprising the metal can include metals such as silver, aluminum, platinum, or combinations thereof. Examples of compounds comprising the metal includes, but is not limited to, silver nitrate, ammonium tetrachloroplatinate(II), and aluminum chloride.

Suitable organic binders include functional groups that can bind to metal ions (e.g., amine groups) including nonmetal-containing ligands. One example of an organic binder that includes functional groups that bind to metal ions in a liquid precursor is polyallylamine (pAAm).

The precursor solution can optionally include a reducing agent. For example, sodium citrate dihydrate can be added to the precursor solution as a reducing agent when the compound comprising the metal is silver nitrate. In other embodiments, the organic binder acts as the reducing agent.

At 220 of method 200, the precursor solution is irradiated with UV radiation, for example from optical system 108 under the control of controller 102. The UV radiation photo-initiates a reduction process in the liquid precursor that results in formation of metal ions and their counterions. For example, referring to FIG. 1A, UV radiation 107 from optical system 108 can be focused proximate to substrate 120. In other words, the reduction of the metal containing compound results in precursor solution 116 including a plurality of metal ions, their counterions, and the organic binder. The metal ions in the liquid precursor can be present in a range of about 6 mM to about 10 mM. Functional groups on the organic binder in the liquid precursor can be present in a range of about 10 mM to about 30 mM. If present, a reducing agent in the liquid precursor can be in a range of about 3 mM to about 8 mM.

Figure 3A:
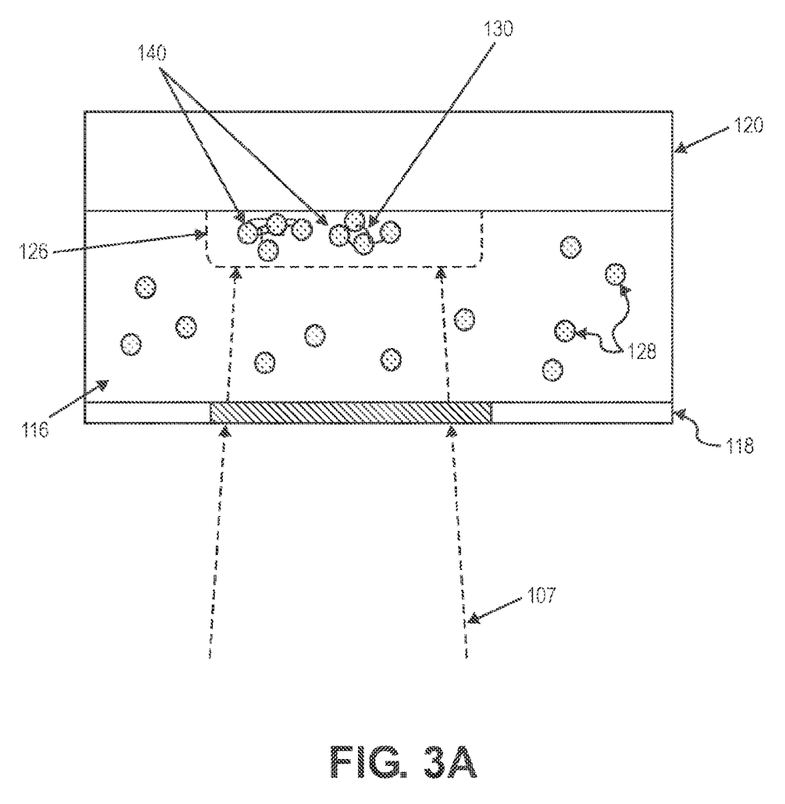
FIG. 3A schematically depicts a reactive zone including metal nanoparticles in an additive manufacturing process according to the present teachings.

At 230 of method 200, continued irradiation of the precursor solution with ultraviolet radiation forms a plurality of metal nanoparticles, wherein each of the plurality of metal nanoparticles comprises the metal and the organic binder. Metal nanoparticles (MNPs) are formed by a photo-initiated chemical reaction and stabilized in the precursor solution as an intermediate product. FIG. 3A shows an enlarged view of a reactive zone 126, for example, in precursor reservoir 118 of FIG. 1A. Continued UV radiation initiates a chemical reaction in reactive zone 126 of precursor reservoir 118 that produces metal nanoparticles 140 (MNPs) from metal ions 128 and organic binder 130. MNPs 140 are formed in reactive zone 126 in precursor reservoir 118 proximate substrate 120.

Figure 3B:
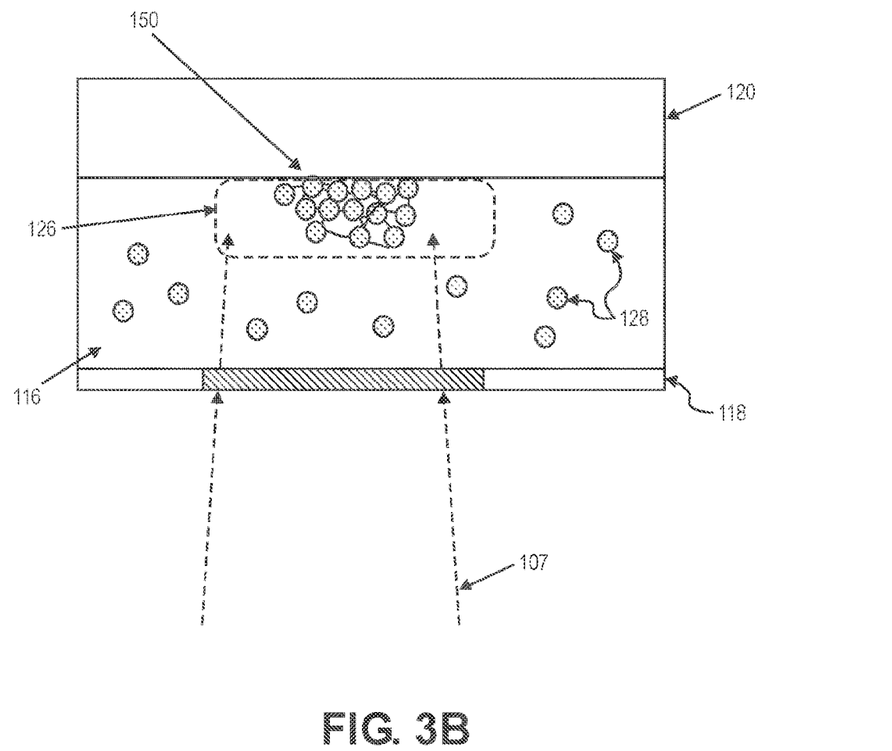
FIG. 3B schematically depicts a reactive zone and binding of metal nanoparticles to format a metal film according to the present teachings.
Figure 4:
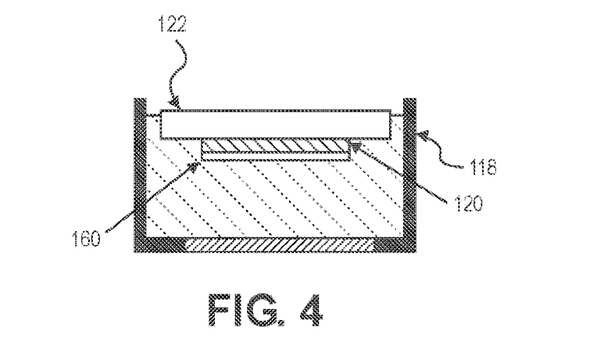
FIG. 4 schematically depicts a reactive zone and formation of a metal film according to the present teachings.

At 240 of method 200, interconnecting the plurality of metal nanoparticles by the organic binder continues until sufficient MNPs coalesce to form a metal film. Referring to FIG. 3B and FIG. 4, MNPs 140 are controllably held together and coalesce by a process including organic binder 130 as depicted by bound nanoparticles 150. This can continue until a metal film 160 is formed to a thickness of about 50 nm to about 200 nm. Depending on the size of the reflector to be formed, stage controller 124 can move motorized stage 122 in a horizontal plane (either left or right or into or out of the page as depicted in FIG. 1A) to extend a width or length of metal film 120 by stitching together printed areas on substrate 122. Optionally, this can also be accomplished using an array of digital light processors 106 each with one or more slight sources.

Although metal film 160 can be printed to any desired thickness via controlling the printing time at 240 of method 200, the procedure may be time-consuming for thick films, as the diffusion limited printing rate is generally in a range of about 2-3 nm per 10 min. While not intending to be bound by any particular theory, it is believed that molecular diffusion plays a role during the metal film deposition. As the metal ions within the reactive zone is consumed, a chemical gradient of reagents is established. Consequently, reagents in the surrounding solution diffuse into the reactive zone, which in turn support the continuous metal film growth depicted in FIGS. 3B and 4. Atomic force microscope (AFM) measurement of printed metal films revealed that the film thickness quickly increases at the first few minutes during the printing. As time of printing continues, the deposition rate drops and reaches a constant level after about 20 min. The initial quick deposition corresponded to a reaction kinetics dominated stage during which the reagents' concentration was sufficiently high. As a result, the printing rate is influenced by the number of photons that trigger the reaction. As the initial reagents in the reactive zone is consumed, the printing rate starts to drop and the rate limiting factor gradually shifts to the reagents' concentration. The rate limiting factor switches from light intensity to reagents' concentration at about 10 min. The final stage corresponds to the state in which a constant chemical gradient is established. Here the printing rate is substantially identical to the diffusion rate, which is determined by the available reagents.

Since the printing speed is faster during the first 10 minutes or so, using multiple printing cycles can reduce the fabrication time for thicker films. Referring to FIG. 2, at 250 of method 200, formation of a thicker metal film in a film-by-film or layer-by-layer manner can occur by replacing the precursor solution after illumination by the UV light for a predetermined time period, for example 10 minutes. Each cycle would thus include refreshed precursor solution to allow deposition and printing of additional metal films at a faster rate compared to controlling just the printing time. In this additive manufacturing approach, additional metal films can be formed until metal film 160 includes of a plurality of metal films and has a thickness of about 50 nm to about 200 nm.

The use of UV radiation to initiate the photochemical reactions provides precise control of the reduction process to form metal ions and of the growth rate of the metal film. This allows formation of metal film 160 to have an RMS surface roughness of about 2 to about 5 nm and a reflectance of about 90% to about 96% at 550 nm. This surface roughness and reflectance can be achieved without any post-processing, such as polishing.

According to the disclosed method, a protective film can optionally be printed on the metal film at 260 of method 200. For example, the metal films and protective films can be printed in one setup utilizing micro-pumps to deliver different precursor solutions for the metal and protective films. The protective films can be a dielectric film, for example, a UV-crosslinkable dielectric polymer with an antireflective coating (ARC) capability. Different surface chemistries (such as self-assembled monofilm, amine-carboxylic acid coupling, etc.) can also optionally be used to promote metal/substrate adhesion (e.g., adhesion between metal film and substrate, metal film and polymer substrate, as well as metal film and protective coating). The disclosed system with appropriate chemical components can be used for meter-scale metal film printing (e.g., for on-site construction of silver CSP mirrors).

Figure 1B:
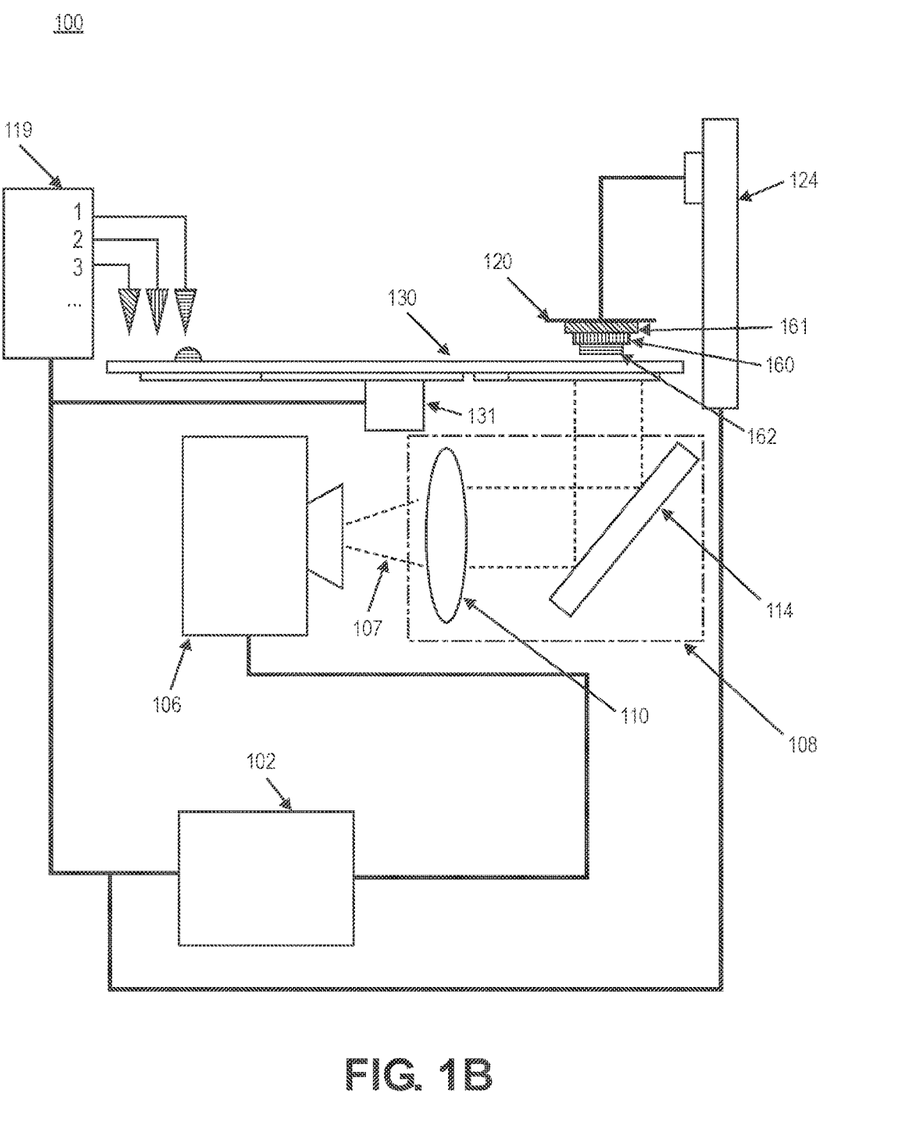
FIG. 1B schematically depicts a stereolithography system for printing metal and protective films in one step according to the present teachings.

Referring to FIG. 1B, an exemplary stereolithography (SL) system 101 for printing metal and protective films in one step is provided. SL system 101 includes a precursor tank 119 that holds, for example, three solutions. A first solution 1 can be used to print a protective coating 162 over the one or more metal films 160. A second solution 2 can be a precursor solution used to print one or more metal films 160. A third solution 3 can be used to print an adhesion film 161 that promotes adhesion between substrate 120 and the one or more metal films 160.

SL system 101 further includes a delivery wheel 310 that transports the three solutions to the reaction zone for printing. Delivery wheel 130 is driven by a motor 131 under the control of controller 102. Delivery wheel 130 moves the solutions from precursor tank 119 to the reaction zone for printing. Controller 102 provides instructions to digital light processor (DLP) 106. DLP 106 includes one or more light sources, for example, one or more lasers or LEDs that emit radiation 107 in the ultraviolet (UV) range. Radiation 107 from DLP 106 is provided to optical system 108. Optical system 108 includes one or more lenses 110, a beam splitter 114 or mirror, and other optical components. In operation, substrate 120 can be mounted in SL system 101 on a motorized stage that is operatively coupled to stage controller 124 and can be controlled by controller 102. Third solution 3 can print adhesion film 161 onto substrate 120. Second solution 2 can then print one or more metal films 160 over adhesion film 161. First solution 1 can then print protective coating 162 over the one or more metal films 160.

The disclosed method can be used with variety of substrates, including glass, silicon, silicone, synthetic polymers (hydrophilic epoxy and hydrophobic polystyrene), papers and hydrogels. By doing a film-by-film or layer-by-layer printing as disclosed herein, it is also possible to directly fabricate metal patterns on curved substrates. The disclosed printing capabilities allow the fabrication of curved, organic-inorganic hybrid CSP reflectors using a single SL platform.

Figure 8:
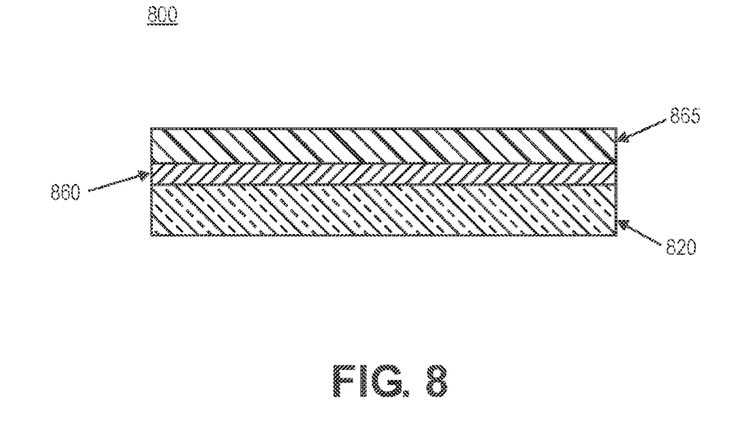
FIG. 8 schematically depicts a cross section of a reflector for a CSP plant according to the present teachings.

FIG. 8 schematically depicts a cross section of a reflector in a CSP plant formed by the disclosed method and system. Reflector 800, shown in cross section in FIG. 8A, includes a substrate 820, a metal film 860 disposed on substrate 820, and a protective film 865 disposed on metal film 860. Although appearing as uniform continuous layers, protective layer 865 and metal film 860 can be formed, as disclosed herein, of a plurality of metal film and protective film areas stitched together being adjacent and connected using an array of light sources or by moving the reaction zone as disclosed herein.

Substrate 820 can be formed of glass, plastics, polymers, hydrogels, papers, or inorganic substrates. Although depicted as planar, reflector 800 can be curved or have a three-dimensional geometry. Reflector 800 can be sized as desired, for example, having a length and width dimension of 1 meter×1 meter.

Metal film 860 is disposed on substrate 820 and can be formed of silver, aluminum, or platinum and an organic binder. In an embodiment, metal film 820 can be formed of silver and pAAm. Metal film 820 can have a thickness of about 50 nm to about 200 nm and an RMS surface roughness of about 2 nm to about 5 nm. Additionally, metal film 820 can have a relative reflectivity of about 90% to about 96% at 550 nm where relative reflectivity is defined as the reflectance of printed silver patterns over that of commercial mirrors which are typically 98%-99%. Metal film 820 can optionally be formed of a plurality of metal films formed over each other in a layer-by-layer manner by additive manufacturing to achieve a thickness of about 50 nm to about 20 0 nm.

Reflector 800 further includes a protective film disposed over metal film 820. Protective film 820 can be formed of a dielectric material, a polyacrylate, an epoxy, a silicone and their derivatives. A thickness of protective film 820 can range from $10^0$-$10^3$ μm.

EXAMPLE

To demonstrate the precise control afforded by the disclosed method, a metal silver film was printed using the disclosed method and system as a detailed logo onto several substrates including epoxy, silicon, PDMS, polystyrene PS, agarose, and paper.

The precursor solution used for silver printing was formed by mixing silver nitrate, sodium citrate dihydrate and poly (allylamine) (pAAm). 100 mM silver nitrate stock solution and 100 mM sodium citrate dihydrate stock solution were prepared by dissolving solid chemicals in deionized (DI) water. A pAAm stock solution that contained 1 M amine group was prepared by polymerizing allylamine. The precursor solution containing 1 M allylamine and 0.57 mg/mL Irgacure 2959 was illuminated by an UV light (BlueWave® 200 UV curing spot lamp) for 3 min. The output power of the UVA band (mainly 365 nm) was set to be 3.0 W cm$^{-2}$. The odor of AAm disappeared after the photopolymerization and the product solution was used as is. Next, 80 μL silver nitrate stock solution, 60 μL sodium citrate dihydrate stock solution and 20 μL PAAm stock solution were added into 0.84 mL DI water to yield the silver precursor. The final concentration of Ag$^+$, citrate ion, and amine groups in the precursor was 8 mM, 6 mM and 20 mM, respectively.

The metal printing was conducted using a projection lithography-based setup such as that depicted in FIG. 1A. A film of the precursor solution was contained between the substrate and the bottom window of the reservoir. The focal plane of the light source was fixed at a constant height above the window while the substrate was moved up and down using a motorized stage to match the focal plane. A CMOS camera was used to monitor the image at the focal plane in real time. Planar silver patterns were first printed to demonstrate the disclosed polymer assisted metal printing. The UV illumination first triggered a photo-reduction reaction at the space near the focal plane, denoted as reactive zone, leading to the formation of silver nanoparticles (AgNPs). Next, the AgNPs underwent a seeded growth step under the presence of Ag ions and reducing agents, which connected individual AgNPs into a united structure. By continuously shinning UV light, more and more silver was deposited in a film-by-film fashion, resulting in the final metal Ag film.

Figure 5A:
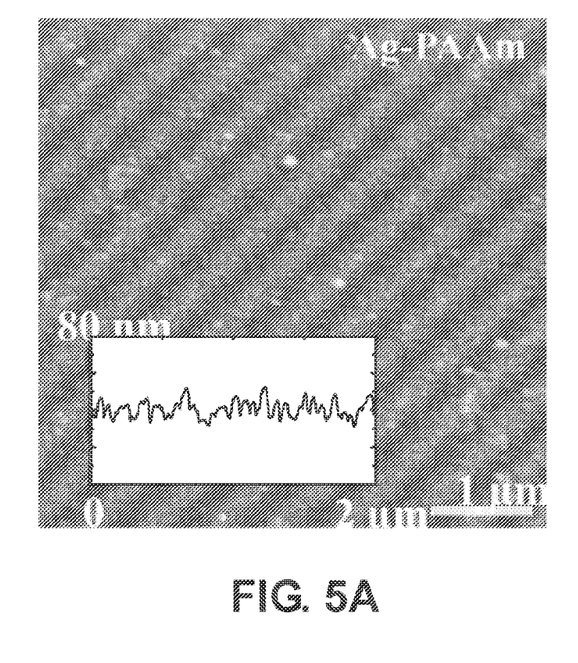
FIG. 5A is a micrograph of a metal silver film showing an atomic force microscope (AFM) scan line of the surface roughness according to the present teachings.
Figure 5B:
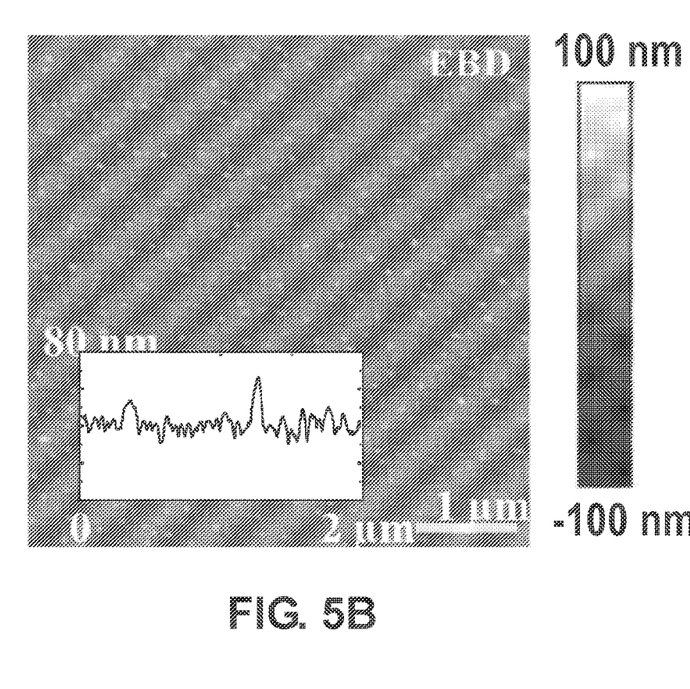
FIG. 5B is a micrograph of a sputtered silver film showing an AFM scan line of the surface roughness according to the present teachings.

FIG. 5A shows a metal silver film formed on the glass substrate. The film-by-film deposition process to form the metal silver film was confirmed by AFM measurements. The top and bottom surface of optically printed silver patterns were examined, the latter of which was realized by a peeling off method using epoxy. It was found that the top surface of printed Ag patterns featured a film of closely packed nanoparticles, but the bottom surface showed up smooth continuous morphology, indicating the fusion of individual nanoparticles. The measured RMS for the bottom surface was 2.8±0.5 nm. AFM measurement revealed that the surface roughness (RMS) of printed metal patterns was about 5.6 nm shown in FIG. 5A, which is similar to the RMS (5.2 nm) of sputter coated Ag films as shown in FIG. 5B. In particular, the sputtered coated silver films featured many big islands spanned by relatively flat regions. In comparison, the metal silver film had a little larger average grain size, but the number of big islands was reduced. This suggests that the seeding and growth of metals in the disclosed method followed a single pathway, which led to more metal distributions of grain sizes. Overall, the printing methods described herein were able to yield metal films of a similar quality as those fabricated by conventional sputtering deposition methods.

Figure 6A:
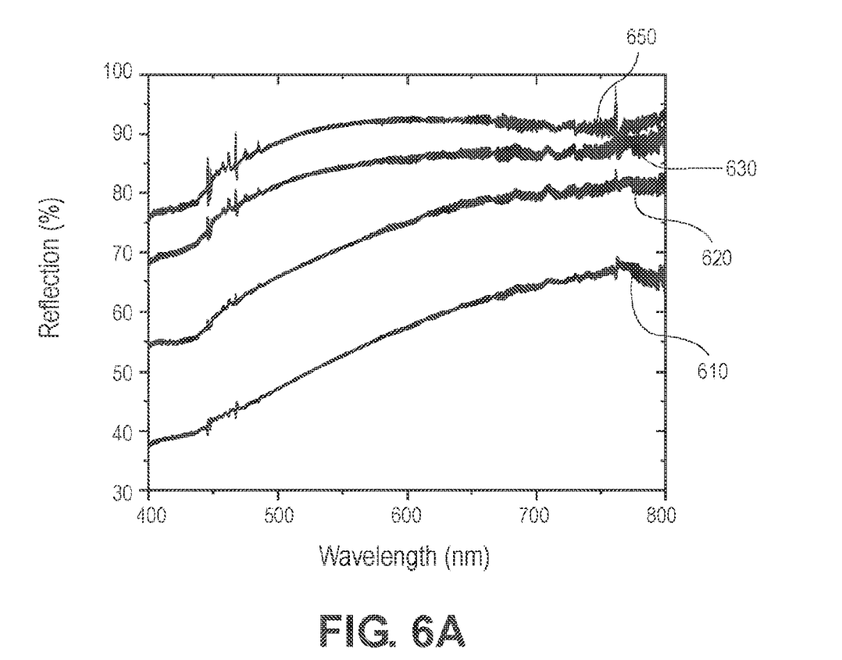
FIG. 6A is a graph showing reflection as a function of wavelength for metal silver films according to the present teachings.
Figure 6B:
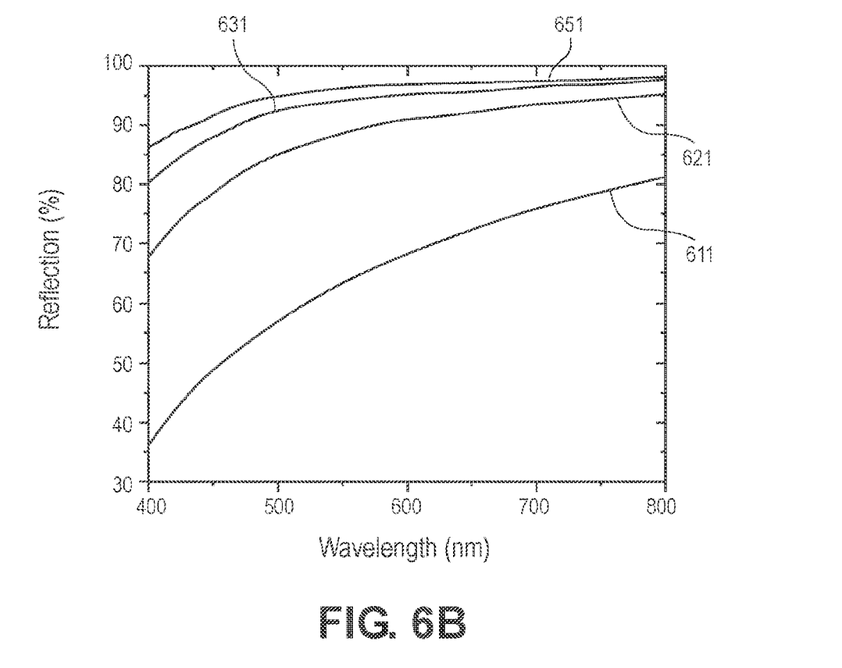
FIG. 6B a graph showing reflection as a function of wavelength for simulated silver films according to the present teachings.
Figure 6C:
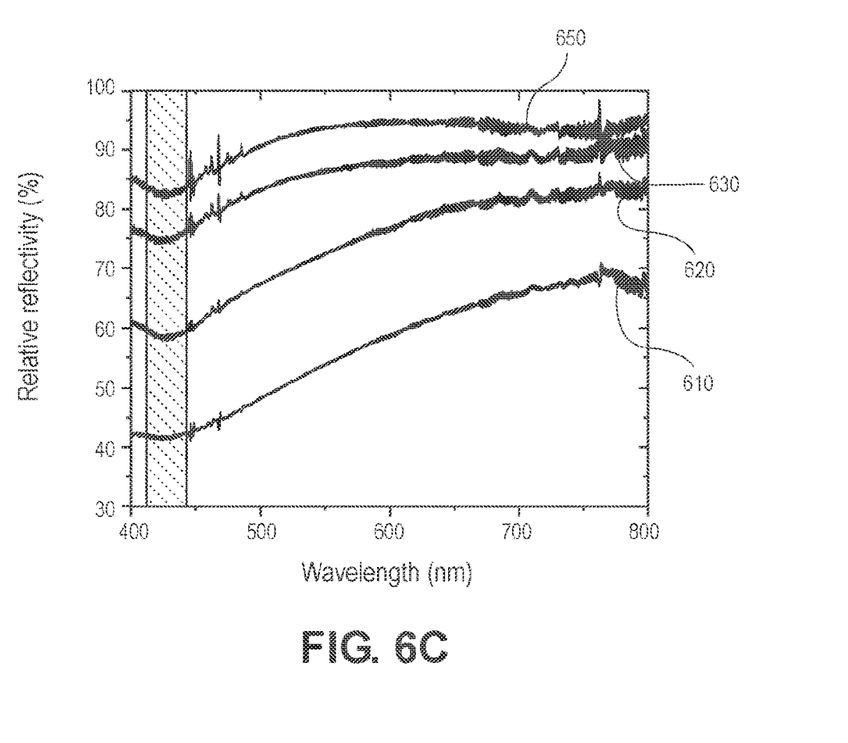
FIG. 6C is a graph showing relative reflectivity as a function of wavelength according to the present teachings.

The relative reflectivity of silver films made according to the methods disclosed here were examined under a spectrometer. FIG. 6A shows reflectance of metal silver films on glass substrates in which a first sample 610 had one print cycle, a second sample 620 had two print cycles, a third sample 630 had three print cycles, and a fourth sample 650 had five print cycles. Each print cycle printed a metal film of about 23 nm. The average reflectance above 500 nm reached >50% for first sample 610 having one print cycle and >90% for fourth sample 650 having five print cycles. Finite-difference time-domain (FDTD) simulations in FIG. 6B show that the experimental reflectance was very close to theoretical values for a first simulation 611 having one print cycle, a second simulation 621 having two print cycles, a third simulation 631 having three print cycles, and a fourth simulation 651 having five print cycles, demonstrating the superior quality of as-printed silver films. FIG. 6C shows a plot of relative reflectivity as a function of wavelength for first sample 610 having one print cycle, second sample 620 having two print cycles, third sample 630 having three print cycles, and fourth sample 650 having five print cycles. As shown in FIG. 6C, the measured reflectance after five printing cycles was very close to that of commercial silver mirrors, usually having a thickness of over 100 nm. Here the relative reflectivity was defined as the reflectance of printed silver patterns over that of commercial mirrors. As can be seen, an average 95% relative reflectivity was reached by fourth sample 650 having 5 print cycles. A shallow dip in the relative reflectivity was observed at around 430 nm for all the printed metal films, which was attributed to the plasmonic absorption of the surficial AgNP film.

Figure 7:
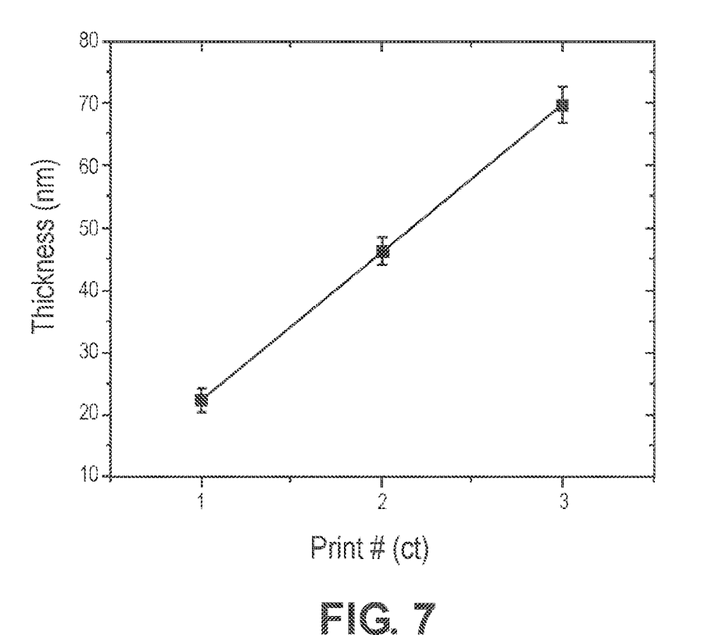
FIG. 7 is a graph showing a thickness of printed silver films as a function of printing cycles according to the present teachings.

As discussed herein, it is possible to build up arbitrary film thickness via controlling the printing time, the procedure may be too time-consuming for thick films, as the diffusion limited printing rate was only 2-3 nm per 10 min. Since the printing speed was faster during the first 10 min, using multiple printing cycles can be used for constructing thick films. After each illumination, the precursor film under the substrate could be refreshed by replacing the precursor solution and a new printing could be conducted. The accumulative thickness showed a decent linear relationship with the number of printing cycles as shown by the mathematical fittings shown in FIG. 7, making this technique suitable for printing both thin and thick metallic patterns. Under the experimental conditions (10 min, 24.6 mW), the slope was calculated to be 23.8 nm and the $R^2$ was 1.000.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of forming a reflector for a concentrated solar power system, the method comprising:
   forming a precursor solution comprising a liquid, a compound comprising a metal, and an organic binder;
   irradiating the precursor solution with ultraviolet radiation to form a plurality of metal nanoparticles, wherein each of the plurality of metal nanoparticles comprises the metal and the organic binder; and
   interconnecting the plurality of metal nanoparticles by the organic binder to form a metal film on a substrate, wherein the substrate has an area of at least 1 square meter and wherein the metal film comprises an RMS surface roughness of about 2 to about 5 nm and a relative reflectivity of about 90% to about 96% at 550 nm,
   wherein the organic binder is polyallylamine.

2. The method of claim 1, wherein the metal is silver, aluminum, platinum or mixtures thereof.

3. The method of claim 1, wherein irradiating the precursor solution with ultraviolet radiation to form a plurality of metal nanoparticles comprises:
   photo-initiating a reduction of the compound comprising the metal to form a plurality of metal ions; and
   binding of a portion of the metal ions by the organic binder to form the metal nanoparticles.

4. The method of claim 1, wherein the precursor solution further comprises a reducing agent.

5. The method of claim 4, wherein the reducing agent comprises sodium citrate, and the metal is silver.

6. The method of claim 1, further comprising depositing the metal film to cover an area of at least about 1 square meter.

7. The method of claim 1, wherein interconnecting the plurality of metal nanoparticles by the organic binder to form the metal film on a substrate comprises one or more cycles of refreshing the precursor solution.

8. The method of claim 1, further comprising extending an area of the metal film by using an array of light sources to form adjacent and connected areas of metal film on the substrate.

9. The method of claim 1, further comprising extending an area of the metal film by moving a light source irradiating the precursor solution with ultraviolet radiation to form adjacent and connected areas of metal film on the substrate.

10. The method of claim 1, further comprising forming a protective coating on the metal film, wherein the protective coating comprises a dielectric.

11. The method of claim 1, further comprising, prior to irradiating the precursor solution with ultraviolet radiation to form a plurality of metal nanoparticles, depositing an adhesion film on the substrate to promote adhesion of the metal film to the substrate.

* * * * *